United States Patent [19]

Werner et al.

[11] 4,169,821

[45] Oct. 2, 1979

[54] MODIFIED HYDROCARBON RESIN COMPOSITION FOR USE IN PRINTING INK

[75] Inventors: Gerhard Werner, Glashütten; Hans-Jürgen Tietz, Langenhain; Reinhard Wagner, Naurod; Wolfgang Dathe, Auringen, all of Fed. Rep. of Germany

[73] Assignee: Hoechst Aktiengesellschaft, Frankfurt, Fed. Rep. of Germany

[21] Appl. No.: 809,798

[22] Filed: Jun. 24, 1977

Related U.S. Application Data

[63] Continuation-in-part of Ser. No. 483,418, Jun. 26, 1974, abandoned.

[51] Int. Cl.$^2$ .............................. C08F 8/10; C08F 8/14; C08F 255/00; C09D 11/10
[52] U.S. Cl. ............................. 260/27 BB; 260/27 R; 525/75; 525/92; 525/133; 525/152; 525/206; 525/166; 525/176; 526/290; 525/177; 260/DIG. 38; 525/210; 525/301; 525/289
[58] Field of Search .................................. 106/28-32; 526/19, 54, 290; 260/874, 878, 879, 27 BB, 27 R, 846, DIG. 38

[56] References Cited

U.S. PATENT DOCUMENTS

| | | | |
|---|---|---|---|
| 2,023,495 | 12/1935 | Thomas | 526/11.1 |
| 2,234,958 | 3/1941 | Bradley et al. | 260/22 CQ |
| 2,336,983 | 12/1943 | Erickson et al. | 106/30 |
| 2,993,880 | 7/1961 | Aldridge et al. | 260/879 |
| 3,468,829 | 9/1969 | Yoshioka et al. | 260/27 |
| 3,574,792 | 4/1971 | Hayashi | 260/894 |
| 3,775,381 | 11/1973 | Hayashi et al. | 260/875 |
| 3,847,850 | 11/1974 | Rudolphy | 106/28 |
| 3,887,641 | 6/1975 | Tsuchiya et al. | 260/845 |
| 3,929,736 | 12/1975 | Sato | 260/874 |
| 3,984,381 | 10/1976 | Tsuchiya et al. | 106/32 X |
| 4,028,119 | 6/1977 | Yamada et al. | 106/32 |

*Primary Examiner*—Allan Lieberman
*Attorney, Agent, or Firm*—Littlepage, Quaintance, Murphy, Richardson and Webner

[57] ABSTRACT

A composition for use as a binder in a non-aqueous printing ink which comprises a modified hydrocarbon resin containing carboxylic acid units, the carboxylic groups of which are partially esterified with a polyhydric alcohol in such an amount that the modified hydrocarbon resin product contains from 0.01 to 0.7 ester groups of polyhydric alcohol based on each acid group originally present and a process for its preparation.

12 Claims, No Drawings

MODIFIED HYDROCARBON RESIN COMPOSITION FOR USE IN PRINTING INK

This application is a continuation-in-part of U.S. application Ser. No. 483,418 filed June 26, 1974.

This invention is concerned with improvements in binder compositions possessing utility in the production of printing inks.

Hydrocarbon resins have been used as binders in the manufacture of printing inks, particularly for toluene rotogravure printing and, in attempts to improve the properties of such hydrocarbon resins, various derivatives have been prepared. Thus, hydrocarbon resins have been modified with acid and/or anhydride groups and esters have been formed with monohydric and/or polyhydric alcohols. Additionally, hydrocarbon resins have been reacted with dienophilic, aliphatic, olefinically unsaturated polycarboxylic acid units e.g. fumaric acid or maleic anhydride, refluxed with vegetable oils and then finally esterified with polyhydric alcohols, e.g. glycerol or pentaerythritol. Such modified hydrocarbon resins may be used as coating compositions but they are less suitable for use as binders for printing inks on account of their low melting points.

It is also known that hydrocarbon resins which have been prepared by a Friedel-Crafts polymerisation can be reacted with at least 1%, e.g. from 2 to 8% of maleic anhydride and then with a polyhydric alcohol, e.g. ethylene glycol. The softening point of the resin is thereby raised to at least 102° C. and the reaction products may be used as binders for floor tiles.

The use of modified hydrocarbon resins in the production of gravure inks has been investigated. Thus, hydrocarbon resins which have been prepared by a Friedel-Crafts polymerisation have been reacted with an unsaturated carboxylic acid or anhydride thereof such as maleic anhydride, and the product so obtained has been esterified with 0.2 to 2 mol of a monohydric alcohol per equivalent of unsaturated carboxylic acid to produce a resin which has a softening point above 145° C. According to the publication in which this process has been disclosed, esterification with polyhydric alcohols is explicitly excluded because the solution obtained from a resin which has been esterified in this way would have too high a viscosity and would thus be unsuitable for producing a gravure ink because it would be unsuitable for film formation. According to a comparison example given in the said publication, the acid modified petroleum hydrocarbon resin was esterified with ethylene glycol in a quantity which was equimolar with the acid anhydride. The product was partly insoluble in toluene. Even when the soluble portion alone was dissolved in toluene, the soluble constituents were so highly viscous that the prints obtained after suitable dilution had no gloss. The products possessed no practical utility as printing ink binders.

According to the invention therefore there is provided a composition for use as a binder in a non-aqueous printing ink which comprises a modified hydrocarbon resin containing carboxylic acid units, the carboxylic groups of which are partially esterified with a polyhydric alcohol in such an amount that the modified hydrocarbon resin contains from 0.01 to 0.7 ester groups of polyhydric alcohol based on each acid group originally present. Preferably the composition contains from 0.05 to 0.3 ester groups of a polyhydric alcohol.

By the term carboxylic acid units we mean carboxylic acids and their derivatives such as anhydrides and esters. When the term "acid group" is used, it should be understood that one anhydride group is taken as being equivalent to two acid groups.

The compositions according to the invention may also contain up to 80% and preferably up to 50% of ester bonds with monohydric alcohols, based on the number of ester bonds with polyhydric alcohols, may be present for each acid group originally present. The total number of ester bonds, based on the number of acid groups originally present, however, should not be more than 90%. This addition of monohydric alcohols may be used to adjust the melting points and viscosity of the printing ink binders. In addition, these alcohols improve the wetting of the pigments and increase the gloss and colour density of the ink. Based on the end product, the proportion of polyhydric alcohol component is generally 0.1 to 7% by weight, although it may be higher when using alcohols with a relatively high molecular weight and low functionality and it may be lower when using alcohols with a relatively low molecular weight and a high functionality.

In the compositions according to the invention, part of the acid or anhydride groups of the polycarboxylic acid units will be in semi-ester form and part will either be in completely esterified or unesterified form. If more than one hydroxyl group of the alcohol is esterified, the alcohol component may bring about chain lengthening and, if at least three hydroxyl groups of the alcohol are esterified cross-linking may occur.

The compositions according to the invention have an elevated molecular weight and melting point. The invention therefore enables the molecular weight and melting points to be tailored by selection of alcohols of particular chemical structure and valency according to the properties desired of the printing ink. Printing inks prepared in this way, particularly those used for toluene rotogravure printing, have greater colour density and better flash-off than printing inks based on the resins previously known.

The invention also relates to a process for the preparation of a composition as described hereinbefore which comprises polymerising a mixture of unsaturated monomeric hydrocarbons whereafter the product is subjected to an addition reaction with either (a) olefinically unsaturated polycarboxylic acid units followed by esterification with a polyhydric alcohol, or (b) olefinically unsaturated esters of carboxylic acids with polyhydric alcohols wherein, in embodiment (a), a part of the polycarboxylic acid units is copolymerized with unpolymerized monomers remaining in the hydrocarbon resin mixture formed initially and the products of this side reaction are at least in part graft-polymerized to the hydrocarbon resin being present. In case (a) and (b) the addition is preferably performed immediately in the polymerisation solution without a previous elimination of the unpolymerized monomers.

Suitable esters for use in the case of (b) are esters of acrylic, methacrylic and/or maleic acid with, for example, ethanediol, propanediol and other polyhydric alcohols mentioned below, in particular trimethylolethane or trimethylolpropane, 1,3-dimethylolpropanediol and/or pentacrythritol. The esters should be substantially monomeric.

Both of the above-described process variations have the advantage that the monomers used for producing the resins are of the kind which in the processes previously employed had to be removed after polymerisation for producing resins with high melting points, e.g. by distillation. Additional separation of the hydrocarbon fractions by distillation can also be avoided and at the same time the resins used as starting materials can now be produced by the polymerisation of hydrocarbon monomers which have previously had to be discarded for this purpose, e.g. substituted indenes such as methylindenes, because it has been found that even these previously unwanted monomers which are difficult to polymerise, e.g. the above-mentioned substituted indenes as well as β-methylstyrene, α,β-dimethyl styrene and 4-phenyl-1-butene are particularly suitable for producing printing inks according to the invention. The invention therefore enables products for use in printing inks to be obtained in improved yield referred to the starting monomers, and of improved quality.

The process according to the invention is suitably carried out at temperatures of at least 160° C., if desired also in the presence of peroxides which are used in the usual quantities, e.g. diacyl and diaroyl peroxides such as benzoyl peroxide, 2,4-dichlorobenzoylperoxide, p-chlorobenzoyl peroxide, lauroyl peroxide, acetylbenzoyl peroxide, succinyl peroxide, acetyl peroxide, dibutyryl peroxide as well as ketone peroxides and hydroperoxides such as cyclohexanone peroxide, cumene hydroperoxide, methyl ethyl ketone peroxide and methyl isobutyl ketone peroxide and other peroxidic organic compounds such as t-butyl perbenzoate or t-butyl perocotate.

It is particularly suitable to use printing ink binders in which the alcohols used as esterification components for the hydrocarbon resins contain 2 to 10 and preferably 3 to 5 carbon atoms in a straight chain between two alcoholic OH groups this chain and carrying at least one alkyl and/or alkylol group with 1 to 3 carbon atoms or one aryl group with 6 to 10 carbon atoms or at least one hydroxyl group or the alcohols contain one aliphatic ring between the alcoholic hydroxyl groups. In all cases, however, the total number of carbon atoms should not exceed 20 and preferably not 10. The best properties are obtained if the polyhydric alcohols used as esterification component have at least one methylol group attached to a tertiary carbon atom.

The polyhydric alcohols may be saturated or unsaturated. Suitable examples include ethylene glycol and its oligomers such as diethylene glycol, propylene-1,2-glycol, 2-methylpropanediol, 2-phenylpropanediol, 1,4-dimethylolcyclohexane, the various cyclohexanediols, 1,4-dimethylcyclohexanediol-(1,2), 1,4-dimethylolbenzene, 1,2-dihydroxy-2-methyl-1-phenyl-propane, 1,4-bis-hydroxymethylbenzene, dipropyleneglycol, the various butane, pentane, hexane and heptane diols, neopentylglycol, trimethylolethane and propane, pentaerythritol and dipentaerythritol, glycerol, diglycerol, sorbitol, cycloaliphatic alcohols such as 2,2-bis-(4-hydroxycyclohexyl)-propane, butene-2-diol-(1,4), butyne-2-diol-(1,4) and hexene-3-diol-(2,5). The type and quantity of polyhydric alcohols will be selected according to the desired molecular weight or melting point or chemical nature of the hydrocarbon resins used as starting materials. Aliphatic dihydric alcohols with a straight chain and particularly those with a longer chain, e.g. with over 10 carbon atoms, would therefore generally only be used in small quantities in order to avoid the formation of highly viscous resins with insoluble constituents or tacky prints. These compounds should not contribute more than 20% of the total number of alcoholic hydroxyl groups.

Suitable monohydric alcohols are those with 1 to 30 and preferably at least 4 carbon atoms, e.g. alcohols with 4 to 20 carbon atoms such as methanol, ethanol, the various butanols, hexanols, octanols, fatty alcohols obtained by hydrogenation of natural fatty acid mixtures and benzyl alcohol. The addition of monohydric alcohols may be used to adjust the melting points and viscosity of the printing ink binders. In addition, these alcohols improve the wetting of the pigments and increase the gloss and colour density.

The printing inks according to the invention are distinguished by their good film formation, high gloss and high colour density. In addition, the invention has the advantage that hydrocarbon resins of the kind which were previously unsuitable as printing ink binders may be used, e.g. resins having a relatively low melting point which have poor physical drying properties.

The hydrocarbon resins used as starting materials are generally prepared from hydrocarbon fractions boiling at 20° to 230° C. These may contain the following monomers: monoolefins and diolefins with 5 to 10 carbon atoms such as isoprene, n-pentene, isopentene, pentadiene-(1,3), cyclopentene, cyclopentadiene, dicyclopentadiene, styrene, ethyl- and α-methyl-3-ethylstyrenes, the various vinyltoluenes, divinylbenzenes, indenes and coumarone. Butadiene may also be present in a quantity of up to 5 mol percent. The fractions may also contain compounds such as α- and β-methylstyrenes, substituted α- and β-methylstyrenes, allylbenzene, the various phenylbutenes and -propenes such as 1-phenylbutene-3, 2-phenylbutene-2, 2-phenylbutene-1, 2-methyl-1-phenyl-propene-(1), 2-benzylpropene or methylindenes, but these compounds should only be present in small quantities because they also have a chain terminating action.

The monomer mixtures suitably contain at least 70% by weight of monoolefine units, preferably aromatic monoolefine units, and not more than 30, preferably not more than 10% by weight of aromatic and/or aliphatic diolefine units, the percentages being based on the total amount of the monoolefine and diolefine units and thus based on the sum of all polymerisable monomers present. Low boiling dienes, e.g. those boiling within a range of −20° C. to 50° C., were hitherto undesired because they reduce the molecular weight of the polymerisation product and the melting point. For this reason, it has generally in the past been necessary to remove them before polymerisation. The present invention now provides the possibility of using these monomer components, thereby not only increasing the resin yield and rendering the process more economical but also enabling qualitatively high grade resins to be obtained.

The monomer mixtures suitably also contain at least 15% by weight of indenes, based on the sum of all polymerisable monomers present. If, for example, resins which have only a low indene content are used as starting materials, e.g. resins containing up to 30% by weight of indenes, based on the original monomer mixture, or if resins with a low molecular weight are used, e.g. with an average molecular weight of less than 2000 and particularly below 1000, it is generally necessary to use higher proportions of polyhydric alcohols, e.g. 1.5 to 7% by weight, than in the case of resins with a higher molecular weight or higher indene content. It has not hitherto been possible to produce suitable binders for rotogravure printing inks from hydrocarbon resins containing less than 30% of indenes, based on the polymerisable monomers used as starting material, because the products then obtained had too low a melting point, too low a molecular weight and insufficient viscosity in toluene for this purpose.

To prevent unwanted or uncontrolled increase in the molecular weight, it is advantageous to carry out the polymerisation in the presence of chain terminating agents, particularly hydrocarbons with boiling points above 180° C., e.g. indane, methylindane, poly-substituted aromatic hydrocarbons such as xylene, 1,2,4-trimethylbenzene, 1,2,4,5-tetramethylbenzene, 1,4-dimethylnaphthalene, 1-methyl-2-isopropenylbenzene and 2-methyl-1-phenylbutene-(1) as well as phenylbutenes and propanes mentioned in the above list of monomers.

Suitable carboxylic acid units incorporated in the resin include olefinically unsaturated mono- or polycarboxylic acids, particularly those which are mono- or dibasic and contain 3 to 15 C atoms, e.g. acrylic acid, methacrylic acid, maleic acid, fumaric acid Δ4,5-tetrahydrophthalic acid, citraconic acid and itaconic acid or their anhydrides (where they exist), and these may be used either individually or as mixtures. The proportion of carboxylic acid units in the unesterified resin may be 0.5 to 40% by weight and preferably 4 to 15% by weight.

Preparation of the binders used for the printing inks according to the invention may be carried out not only by the process according to the invention mentioned above but also by known methods. For example the aforesaid acid units may be added to the resins either as such or in the form of their esters with the above-mentioned polyhydric alcohols. Apart from the esters of the above-mentioned carboxylic acids with the above-mentioned polyhydric alcohols, another monomeric ester which is suitable for this purpose is trimethylolpropane-tris-acrylic acid ester. Both the monomeric esters which are still capable of addition reactions and the finished binder may still contain free alcoholic OH groups which are capable of further cross-linking or other reactions, e.g. with isocyanates.

The printing inks according to the invention may contain additional resins as binders, for example coumarone- or indene resins, hydrocarbon resins, acid modified hydrocarbon resins, calcium modified, hydrogenated, disproportionated colophony, ester resins, colophony modified phenol resin, phenol formaldehyde condensates, alkylphenolformaldehyde condensates, colophony modified maleate resin, salt modified, acid-containing hydrocarbon resins, and unmodified or salt modified telomers, e.g. those based on styrene-maleic anhydride. These resins may also be at least partially partly incorporated chemically into the hydrocarbon resin, e.g. by addition. This addition may optionally be carried out before or during the addition reaction of the unsaturated polycarboxylic acid unit, e.g. by the addition of natural resins, in which case addition of the polycarboxylic acid units to the natural resin may also take place.

Compared with printing inks produced from the known unesterified hydrocarbon resins, these printing inks have improved colour density, gloss and glaze on account of the larger number of polar groups in the resin. In addition, resins with good printing properties can be produced without having to observe certain minimum melting points and toluene viscosities in the resins used as starting materials. To obtain a desired amount of flash-off and wetting of pigments it has previously been necessary to start with unmodified hydrocarbon resins with certain melting points and toluene viscosities. The products also show very good pigment wetting in addition to their good flash-off properties. Good pigment wetting could previously be achieved only with low molecular weight resins and even then only at the expense of the flash-off properties. Owing to the good wetting of the pigments, a smaller amount of pigment is required than before to achieve the same colour densities as in the known acid modified hydrocarbon resins or commercial colophonyl resins.

In the following examples which illustrate the invention, P means parts by weight and % means percent by weight.

The viscosity was determined in each case in a 50% solution in toluene at 20° C.

The various fractions used in the examples are as follows:

Table 1

| Fraction boiling range °C. | I 20–136 | II 136–165 | III 165–171 | IV 171–185 | V 185–230 |
|---|---|---|---|---|---|
| Monoolefins inclusive Indenes % | 40 | 46 | 44 | 59 | 67 |
| Indenes % | — | 2 | 7 | 23 | 42 |
| Diolefins % | 40 | 8 | 14 | 12 | 6 |
| other compounds(non-polymerisable hydrocarbons) | 20 | 46 | 42 | 29 | 27 |
| Total | 100 | 100 | 100 | 100 | 100 |

EXAMPLE 1

(a) Preparation of the Starting Resin 1 kg of a mixture of hydrocarbons composed of the following quantities of four fractions:

| Group | % by weight | Mono-olefins P | Indenes P | Di-olefins P | Total olefine content (= Mono-Diolefins) P |
|---|---|---|---|---|---|
| I | 6.0 | 2.4 | — | 2.4 | |
| II | 10.5 | 4.83 | 0.21 | 0.84 | |
| III | 47.7 | 21 | 3.34 | 6.69 | |
| IV | 35.8 | 21 | 8.24 | 4.3 | |
| Total | 100.0 | 49.28 | 11.79 | 14.23 | 63.51 |
| Percentage in total olefine content % | — | 77.5 | 18.5 | 22.4 | |
| Percentage indenes in monoolefins % | | | 23.9 | | |

This mixture is polymerized at −5° C. with 7.5 g of BF$_3$-phenol. After washing out the catalyst with water and distillation of the volatile components 550 g of a resin having a melting point of 120° C. and a viscosity of 85 cP are obtained.

(b) Acid Addition 250 g of the resin obtained are melted and 20 g of maleic acid are added thereto at 180° C. The mixture is reacted for 3 hours at this temperature. 260 g of resin (melting point 140° C., viscosity 150 cP) are obtained.

(c) Esterification (1) 100 g of the product obtained according to (b) are reacted with 3 g of neopentylglycol. Under stirring the mixture is maintained at 190° C. to 200° C. The melting point of the mixture increases to 160° C. within 3 hours, the viscosity to 400 cP.

(2) To 100 g of the product obtained according to (b) 2 g of tetrahydronaphthalene and 0.6 g of glycerine are added at 200° C. After 4 hours the tetrahydronaphthalene is separated under vacuum. Yield: 100 g of resin, melting point 156° C., viscosity 450 cP.

(3) 100 g of the product obtained according to (a) are melted with 5 g of colophony. Subsequently 10 g of maleic anhydride are added and the melt is maintained at 180° C. for a further 3 hours. 3.5 g of neopentylglycol are then added and the mixture is kept, under stirring, for a further 2 hours at 190° to 200° C. The melting point of the resin increases to 165° C., the viscosity to 350 cP. The yield is quantitative.

(4) 100 g of the resin obtained according to (a) are melted for 3 hours with 120 g of colophony and 50 g of maleic anhydride. Then 2.5 g of trimethylolpropane and 1.5 g of decanol are added and the mixture is maintained for a further 2 hours at 200° C. A resin having a melting point of 155° C. and a viscosity of 370 cP is obtained. The yield is quantitative.

(d) Preparation of the Printing Ink and the Printing Test

A 50% solution in toluene is prepared from the resins obtained according to (b) and (c1) to (c4) and is diluted in a DIN-Ford cup to such an extent to achieve an efflux time of 20 seconds. Subsequently 10% of a conventional red pigment is added, the mixture is processed in the usual manner to form a dispersion and toluene is added into the DIN-cup until an efflux time of 20 seconds is attained. The printing ink was applied to a substrate of paper in 6 layers each at a thickness of 6μ. The flask-off time was measured. Furthermore the gloss was determined according to Lange, the colour density was measured in a reflected light densitometer (A Gretag "Densichrom") and the transparency assessed visually in the usual way. The finer the dispersion of the pigments, the higher are the values of the colour density and the better is the transparency. The test results are shown in the table following example 2.

EXAMPLE 2

(a) Preparation of the Starting Resin 1 kg of a mixture of hydrocarbons composed of the following quantities of four fractions:

| Group | % by weight | Mono-olefins P | Indenes P | Di-olefins P | Total olefine content (= Mono-Diolefins) |
|---|---|---|---|---|---|
| I | 10.0 | 4.0 | — | 4.0 | |
| II | 25.6 | 11.7 | 0.5 | 2.02 | |
| III | 38.8 | 17.1 | 2.71 | 5.43 | |
| IV | 25.6 | 15.05 | 5.86 | 3.06 | |
| Total | 100.0 | 47.85 | 9.07 | 14.51 | 62.36 |
| Percentage in total olefin content % | — | 76.6 | 14.55 | 23.3 | |
| Percentage Indenes in Monoolefins % | | | 30.4 | | |

This mixture is polymerized at 0° C. with 10 g of BF$_3$-methyletherate. 500 g of a resin having a melting point of 105° C. and a viscosity of 35 cP are obtained.

(b) Acid Addition 100 g of the resin obtained are reacted as described in Example 1(b) with 8 g of maleic anhydride. The addition product obtained has a melting point of 119° C. and a viscosity of 90cP.

(c) Esterification 1 g of pentaerythritol is added to 107 g of the resin obtained according to example 2(b) and the mixture is maintained at 190° C. for about 2 hours. The product obtained has a melting point of 142° C. and a viscosity of 190 cP.

(d) Preparation of the Printing Ink and the Printing Test

These were prepared according to Example 1 and the results are shown in the following table:

| Binder | 1 b) (comparison) | 1 c1) | 1 c2) | 1 c3) | 1 c4) |
|---|---|---|---|---|---|
| flash-off time in sec. | 50.7 | 45.6 | 44.3 | 46.2 | 44.7 |
| gloss 36μ | 30 | 32 | 35 | 38 | 40 |
| 6μ | 9.0 | 9.8 | 9.6 | 10 | 9.8 |
| colour density (log. units) | 1.65 | 1.80 | 1.86 | 1.8 | 1.85 |
| transparency | worse than c and d | better than b | better than b | better than b | better than b |

| Binder | 2 b) (comparison) | 2 c) |
|---|---|---|
| flash-off time in sec. | 56.6 | 48.2 |
| gloss 36μ | 34.0 | 31.5 |
| 6μ | 9.0 | 8.5 |
| colour density (log. units) | 1.53 | 1.80 |
| transparency | worse than 1b) and 2c) | better than 1b) and 2c) |

Discussion of the Results

As shown in the table, viscosity and melting point are increased by partial esterification. At the same time gloss, colour density, transparency increase and flash-off time decreases. The unesterified comparison resin 2(b) shows a higher gloss than sample 2(c), but owing to its low melting point it is unsuitable for printing inks which should melt at least at 130° C. in order not to adhere to the drying rolls. Besides, it has a longer flash-off time. Sample 2(c) is better than sample 2(b) as far as colour density and transparencey are concerned, whereas it does not attain the still better properties of the resins of example 1(c1) and 1(c2). As compared to the other comparison sample 1(b) the flash-off time and the gloss are improved.

EXAMPLE 3

(a) Preparation of the Starting Resin

Preparation is effected in a manner analogous to that described in Example 1 from 1 kg of a mixture of hydrocarbons composed of the following quantities of five fractions:

| Group | % by weight | Mono-olefins P | Indenes P | Di-olefins P | Total olefine content (= Mono-Diolefins) |
|---|---|---|---|---|---|
| I | 5.4 | 2.16 | — | 2.16 | |
| II | 9.5 | 4.37 | 0.19 | 0.76 | |
| III | 42.7 | 18.3 | 2.99 | 5.98 | |
| IV | 32.3 | 19.05 | 7.43 | 3.88 | |
| V | 10.1 | 6.76 | 4.24 | 0.65 | |
| Total | 100.0 | 50.64 | 14.85 | 13.43 | 64.07 |
| Percentage in Total olefine content % | 79 | 23.2 | 21 | | |
| Percentage Indenes in Monoolefins % | | | 29.3 | | |

The obtained product has a melting point of 83° C. and a viscosity of 40 cP.

(b) Acid Addition

Under the same conditions as described in example 1(b) 8 g of maleic anhydride are added to 100 g of the starting resin obtained according to 3(a). A resin with a melting point of 105° C. and a viscosity of 90 cP is obtained. As printing ink binder for rotogravure the resin is unsuitable owing to its low melting point.

(c) Esterification

The resin obtained according to example 3(b) is reacted for 2 hours with 3 g of neopentylglycol. A resin having a melting point of 144° C. and a viscosity of 243 cP is obtained. It is further processed to a printing ink and tested according to example 1. The test results correspond to the requirements.

EXAMPLE 4

100 g of the starting resin obtained according to Example 1(a) are reacted with 3 g of maleic acid and 2 g of tetrahydrophthalic acid as described in Example 1(b). After 3 hours 0.5 g of trimethylolpropane trisacrylic acid ester and 0.5 g of trimethylolpropane are added. The mixture is maintained at 200° C. for 2 hours and a resin having a melting point of 148° C. and a viscosity of 250 cp is obtained. It is further processed and tested according to Example 1. It complies with the requirements as to the printing technique.

EXAMPLE 5

108 g of the resin obtained according to Example 1(b) are reacted with 2.5 g of trimethylolpropane and 0.5 g of octanol as described in Example 1(c). A resin having a melting point of 156° C. and a viscosity of 445 cP is obtained. It is processed to a printing ink and tested according to Example 1. When tested with regard to the application technique the flash-off times correspond to Example 1(b). The gloss, however, shows values of 45 (36μ) and 12.5 (6μ) is distinctly improved.

EXAMPLE 6

As described in Example 1(b) 6 g of maleic acid and 2 g of acrylic acid are added to 100 g of the starting resin obtained according to Example 1(a). Subsequently the mixture is reacted with 2 g of glycerol for half an hour and for a further 2 hours with 1 g of maleic acid. A resin having a melting point of 131° C. and a viscosity of 230 cP is obtained. Reprocessing and testing is carried out in accordance with Example 1. The printing ink complies with the requirements.

EXAMPLE 7

Example 6 is repeated except that instead of glycerol 3 g of 2-phenylpropandiol are used. A resin with a melting point of 140° C. and a viscosity of 300 cP is obtained. The resulting resins for rotogravure possess good properties as to the printing techniques.

EXAMPLE 8

Example 5 is repeated except that in preparing one sample (a) 1.7 g of cyclohexandiol-1,4 and in preparing another sample (b) 3 g of 1,4-bis-hydroxymethylolbenzol are added each instead of 2.5 g of trimethylolpropane. In Example (a) a resin having a melting point of 147° C. and a viscosity of 380 cP and in Example (b) a resin with a melting point of 160° C. and a viscosity of 420 cP is obtained. The resulting printing inks show good properties as to the printing techniques.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A resin for use as a binder in a non-aqueous printing ink which comprises a salt-free modified hydrocarbon resin based on monomers of unsaturated hydrocarbon fractions having a boiling range between 20° and 230° C. and containing at least 70% by weight of monoolefins including between 15 and 30% by weight of indenes and up to 30% by weight of diolefins said percentages being based on the total of the polymerisable monomers, and said hydrocarbon resin containing adducted thereto at most dibasic carboxylic acid units with 3 to 15 carbon atoms, the carboxylic groups of which are partially esterified with a polyhydric alcohol having 2 to 20 carbon atoms in such an amount that the modified hydrocarbon resin product contains from 0.01 to 0.7 ester groups of polyhydric alcohol based on each acid group originally present and said compositions has a melting point of at least about 130° C.

2. A resin as claimed in claim 1 which contains up to 80%, referred to the ester groups of the polyhydric alcohol as defined in claim 1, of ester groups of monohydric alcohols having from 1 to 30 carbon atoms, the total of the ester groups being at most 90%, based on the acid groups originally present.

3. A resin as claimed in claim 1 wherein the polyhydric alcohol component contains between two alcoholic OH-groups a radical selected from the group consisting of (a) an unsubstituted straight chain alkylene having from 2 to 10 carbon atoms, (b) a straight chain alkylene having from 2 to 10 carbon atoms and also having one ro more substituents and (c) and alicyclic ring, wherein the substituents of (b) are selected from the group consisting of (1) alkyl having 1 to 3 carbon atoms, (2) alkylol having 1 to 3 carbon atoms (3) a combination of (1) and (2) and (4) an aryl having 6 to 10 carbon atoms and one or more OH-groups.

4. A resin as claimed in claim 1 wherein the modified hydrocarbon resin contains one or more polyhydric alcohols as an esterifying component in which at least one methylol group is bound to a tertiary carbon atom.

5. A resin as claimed in claim 1 wherein the alcohol component contains aliphatic straight-chained diols in such an amount that they contribute up to 20% of the total number of alcoholic hydroxyl groups.

6. A composition as claimed in claim 1 wherein the starting hydrocarbon resin is derived from a mixture of unsaturated hydrocarbon monomers from hydrocarbon fractions having a boiling point from 20° to 230° C. containing at least 70% by weight of aromatic monoolefinic units and at most 30% by weight of diolefin units, the percentages being based on the total of the polymerisable monomers.

7. A resin as claimed in claim 1 wherein the starting hydrocarbon resin is based on a mixture of unsaturated monomers containing at least 15% and at most 30% by weight of indenses, referred to the total weight of all polymerisable monomers, and has a molecular weight up to 2000, wherein the final resin contains from 0.1 to 7% by weight of the polyhydric alcohol component and wherein the carboxylic units are derived from a monoolefinically unsaturated mono- or dibasic carboxylic acid having 3 to 15 carbon atoms.

8. A resin as claimed in claim 1 wherein the amount of the carboxylic units as defined in claim 1 in the unesterified starting hydrocarbon resin as defined in claim 1 is from 0.5 to 40% by weight.

9. A composition comprising, in addition to the resin of claim 1, additional resins selected from the group consisting of modified or unmodified hydrocarbon resins, modified colophony, cumarone resins, indene resins, ester resins, unmodified phenol formaldehyde resins and phenol formaldehyde resins being colophony modified as binders.

10. A process for the preparation of a modified hydrocarbon resin as defined in claim 1 which comprises polymerising a mixture of unsaturated monomeric hydrocarbons having a boiling range between 20° C. and 230° C. and containing at least 70% by weight of monoolefins including between 15 and 30% by weight of indenes and up to 30% by weight of diolefins, said percentages being based on the total of the polymerisable monomers, whereafter the product is subjected to an addition reaction with a reactant selected from the group consisting of (a) olefinically unsaturated at most dibasic carboxylic acid units containing 3 to 15 carbon atoms followed by esterification with a polyhydric alcohol having 2 to 20 carbon atoms, (b) olefinically unsaturated esters of at most dibasic carboxylic acids containing 3 to 15 carbon atoms with polyhydric alcohols having 2 to 20 carbon atoms. wherein the carboxylic groups of said at most dicarboxylic acids are partially esterified with said polyhydric alcohol in such an amount that the modified hydrocarbon resin contains from 0.01 to 0.7 ester groups.

11. A process as claimed in claim 10 wherein the mixture of monomers as defined in claim 1, contains a substance selected from the group consisting of (a) up to 10% by weight, referred to the total weight of polymerizable monomers, of dienes.

12. A process as claimed in claim 10, wherein in embodiment (b) the ester is a monomeric ester of a compound selected from the group consisting of acrylic acid, methacrylic acid and maleic acid on one hand and trimethylolethane, trimethylolpropane, 1,3-dimethylpropanediol and pentaerythritol on the other hand.

* * * * *